Patented Sept. 3, 1940

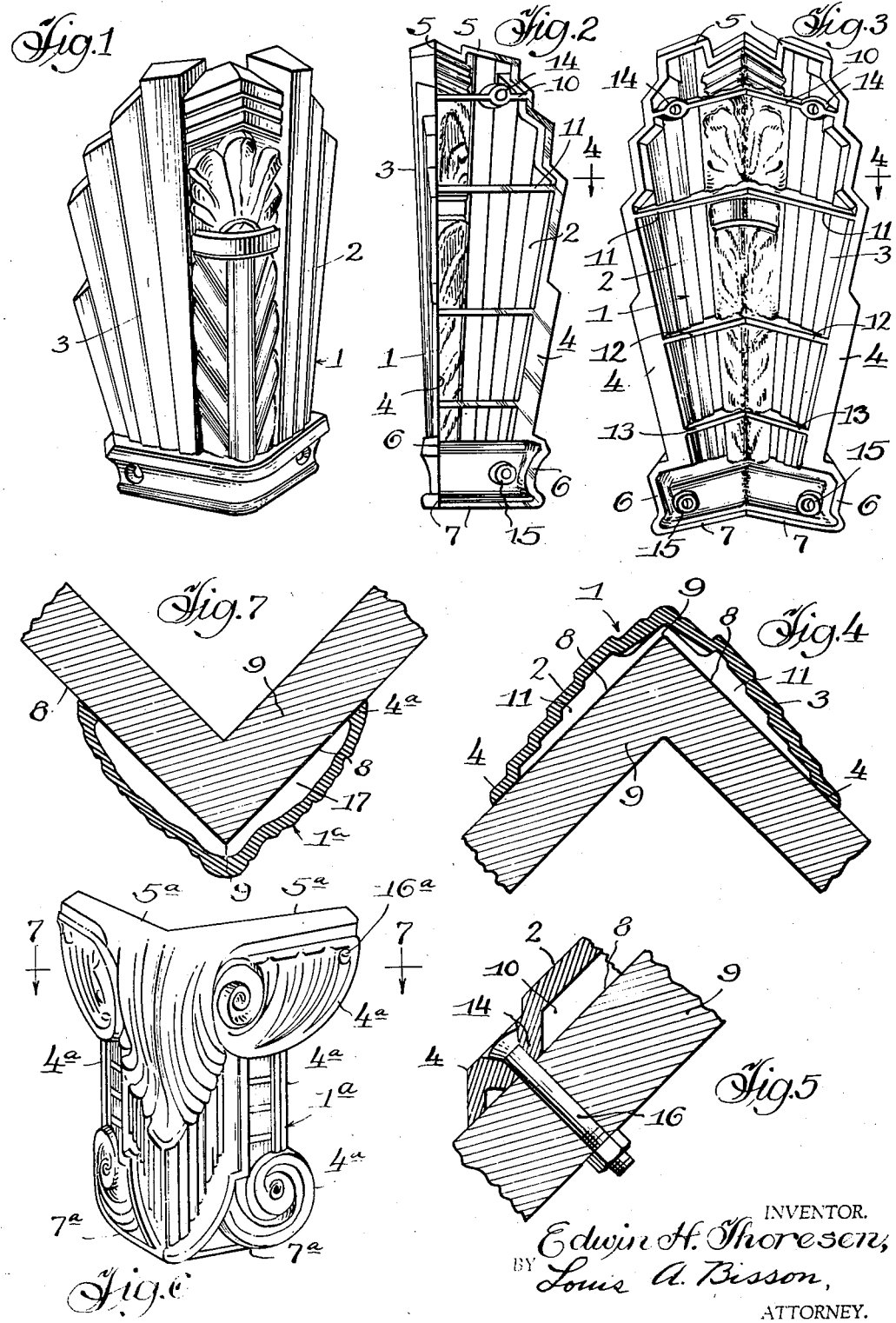

2,213,506

UNITED STATES PATENT OFFICE 2,213,506

ORNAMENTAL PIECE FOR CORNERS OF BURIAL CONTAINERS

Edwin H. Thoresen, Chicago, Ill., assignor to William Thoresen Company, Chicago, Ill., a corporation of Illinois Application June 13, 1939, Serial No. 278,870

4 Claims. (Cl. 41—10)

The present invention relates to ornamental pieces for attachment to corners of burial containers, such as caskets, coffins, and the like.

Heretofore, it has been customary to make pieces for corners of burial containers of metal, usually cast metal, and sheet metal. Such pieces are heavy, costly to make, require machining, and also require finishing operations to make them attractive. No one has previously been successful in making such pieces of substitute material, except in the case of where I disclose in my copending application Serial No. 173,878, filed November 10, 1937, which matured into U. S. Patent No. 2,204,263, June 11, 1940, the making of an ornamental piece of plastic material, and this application is to be considered as a continuation in part to said pending application for all that is common to the two.

The present invention comprehends the idea of making the piece of thermoplastic material. A piece that fits about a corner or is generally in the form of a dihedral angle in cross section and which is made of thin material, ordinarily gives to shocks and knocks to which a burial container is subjected and will split or crack, most usually at the apical portion of the piece. I have discovered after some experimentation that I can successfully use such material as a thermoplastic substance, as would ordinarily not answer the purpose, and that discovery includes the idea of making the piece in the form of a hollow unit composed of a hollow contoured body portion and integral border and rib portions, constituting in the aggregate a series of cellular portions each with border and rib portions, which have the border and rib portions so disposed as to lie flush and in contact squarely with the side walls of the corner of the container. In other words the unit is composed of a group of strong and rigid cellular or honey-comb minor units which give to the unit as a whole the strength and rigidity that could only be otherwise secured by the use of entirely different materials in entirely different forms. The contouring of the body portion will give strength, and the employment additionally of the border and rib portions furnishes further strength and rigidity.

The thermoplastic I preferably use is that known in the trade under the trade name "Tenite." It is basically a cellulose acetate obtained from a cellulose ester. It may be cast or molded to any desired form by the compression molding process or the injection molding process. The mold surfaces are preferably smooth and polished so that the casting when released from the mold has its final desired finish without any necessity of any finishing operation, thus greatly reducing the cost of production.

In the case of my invention, I prefer to cast the pieces by the injection molding process wherein the material, which is initially in granular or powder form, is fused, as at about 360° F. to 370° F. or even as high as 385° F., depending upon the degree of color pigments that may be contained in the substance, and is then injected in liquid form, under a pressure of from about 10,000 to 20,000 pounds per square inch, rapidly into the mold so as to fill all cavities in about or less than one second of time. The mold is already cool or cold so that the thermoplastic will start to set upon injection and will be fully set in about two or three seconds of time. This method gives for a more rapid and cheaper production than by the compression molding method which would involve the several steps (a) of placing the substance or pieces of the substance in the open mold, (b) of heating the mold, (c) of closing the mold and applying pressure, (d) of cooling the mold while maintaining the pressure, (e) of releasing the pressure, (f) of opening the mold, and (g) of ejecting the piece.

Other objects, advantages, capabilities, features, and the like are comprehended by the invention as will later appear, and as are inherently possessed by the invention.

Referring to the drawing:

Fig. 1 is a front view in perspective of an illustrative piece or article embodying the invention;

Fig. 2 is a view in vertical elevation of an inside wall, and of the edge portion of the other wall of the piece;

Fig. 3 is a rear or inside perspective view showing the cellular or honey-comb formation of the unit;

Fig. 4 is a horizontal sectional view taken in a plane represented by line 4—4 in Fig. 3 of the drawing, and including a fragmentary sectional view of a portion of a corner of the container;

Fig. 5 is a fragmentary sectional view similar to Fig. 4 but showing a section, on an enlarged scale, where the fastening elements are connected;

Fig. 6 is a front perspective view of another illustrative form of piece constructed in accordance with the invention; and Fig. 7 is a sectional view similar to Fig. 4 but taken in a plane represented by line 7—7 in Fig. 6 of the drawing.

Referring more in detail to the drawing, the illustrative piece is a casting of plastic material, preferably thermoplastic material, such as a cellulose acetate. It comprises a hollow body 1 of generally angular form in cross section, with generally contoured side walls 2 and 3 which form a sort of dihedral angle.

Along the edges or perimeter of the body are provided border or flange portions 4, as at the sides, border or flange portions 5, as at the upper end, border or flange portions 6 and 7, as at the lower end (see Fig. 3 in particular). All of these border or flange portions lie in planes forming a dihedral angle which coincide with the outer faces or side walls 8 of the corner 9 of the casket or other burial container, or, in other words, the border or flange portions mentioned lie flush with or flat against said side walls 8 of the container corner 9.

Also, the body 1 has integrally formed therewith other flange portions or transverse reinforcing ribs 10, 11, 12 and 13 which extend from the inner or rear of the unit and which have their faces or edges also in the planes of the border or flange portions 4, 5, 6 and 7 so as to lie flat against or flush with the side walls 8 of the corner 9 of the container.

At suitable points integral bosses 14 and 15 also may be cast for the extension therethrough of securing elements 16, such as bolts or the like, which also pass through the side walls of corner 9 of the container, as shown in Fig. 5. In this case also, the surfaces of the bosses 14 and 15 lie in the same planes as of the border and rib portions above described so as to lie flush with the sides 8 of the corner 9.

The part of the body portion 1 which is located between the flanges 5 and the flanges or ribs 10, and also between parts of the side flanges 4, taken together with such flange portions 5, 10 and 4, constitute a cellular part of the unit, the body part of this cellular part because of its contoured formation giving strength to the unit, and the integral flange portions 5, 4 and 10 also giving further strength and rigidity.

Likewise, the body part between the flanges 10 and 11, and flange parts of 4, form together another cellular part of the unit. Similarly, the body part between the flanges 11 and 12, and flange parts of 4, form together another cellular part; and the body part between the flanges 12 and 13, and flange parts of 4, form together a further cellular part, and the body part between the flanges 13 and 7, and the flange parts of 4, and also flanges 6, form together still another cellular part of the unit. In other words, the unit is composed of a series of integral cellular elements or parts each of which has a contoured body part and integral flange parts which all lie flush with the side walls of the container corner, and all of which together form a very rigid and strong unit.

Referring to the form of Figs. 6 and 7, the body 1ª is of contoured form and has border or flange portions 4ª, upper flange portions 5ª, lower flange portions 7ª, and spaced inner flange or rib portions 17 (corresponding to 10, 11, 12 and 13 in Figs. 1 to 5 inclusive), all of which lie flush with the side walls 8 of the corner 9 of the container (see Fig. 7). Bosses may also be formed similar to 14 and 15 in Figs. 2, 3 and 5, for bolts 16ª.

While I have herein described and upon the drawing shown a few illustrative embodiments of the invention, it is to be understood that the invention is not limited thereto but comprehends other constructions, details, arrangements of parts, features, or the like, without departing from the spirit of the invention.

Having thus disclosed the invention,

I claim as my invention:

1. An ornamental piece for corners of burial containers and the like, comprising a hollow unit composed of a series of integral cellular portions each of which has wall portions which are disposed in the planes of a dihedral angle coincident with the side walls of the corner of the container, the body portions of the cellular portions being contoured and spaced from said side walls of said corner and forming in the aggregate a contoured unit for said corner, said unit being composed of integral molded thermoplastic material of a cellulose acetate base.

2. An ornamental piece for fitting about the corner of a burial container and the like, comprising an elongated body portion of generally angular cross sectional form with the perimeter of the body portion disposed to lie flush against the sides of the corner of the container and with the body portion within the perimeter thereof so contoured as to extend away from said sides and provide a space between said contoured portion and said sides, spaced transverse ribs in said space and extending inwardly from said body portion to said sides of said corner for the ribs to also lie flush at their inner edges with said sides, and inwardly extending integral apertured bosses also to lie flush against said sides, said body and perimeter portions and said ribs and bosses being composed of integral molded thermoplastic material.

3. An ornamental piece for corners of burial containers and the like, comprising a molded unit composed of a thermoplastic of a cellulose acetate base and in the form of a contoured hollow body portion with the borders thereof lying in planes coincident with the sides of the corner of the container and with spaced integral reinforcing ribs at the inner side of the body and having their inner surfaces also lying in said planes where the ribs and border portions lie flush against the side walls of the container corner.

4. An ornamental piece for corners of burial containers, comprising a hollow body composed of a thermoplastic material having mold finished surfaces and a border which contacts flush with the side walls of the container corner and which also has integral internal reinforcing ribs also contacting flush with the side walls of the container corner.

EDWIN H. THORESEN.